Sept. 30, 1924.
C. F. BLISS
1,510,032
AUTOMOBILE SIGNAL
Filed Feb. 8, 1922     2 Sheets-Sheet 2
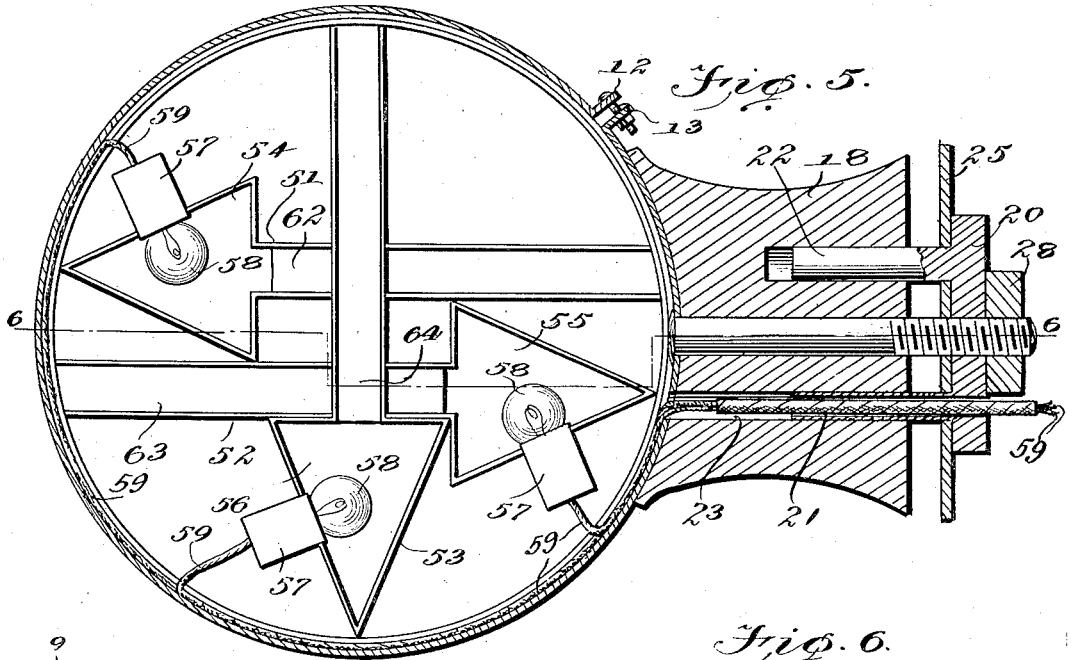
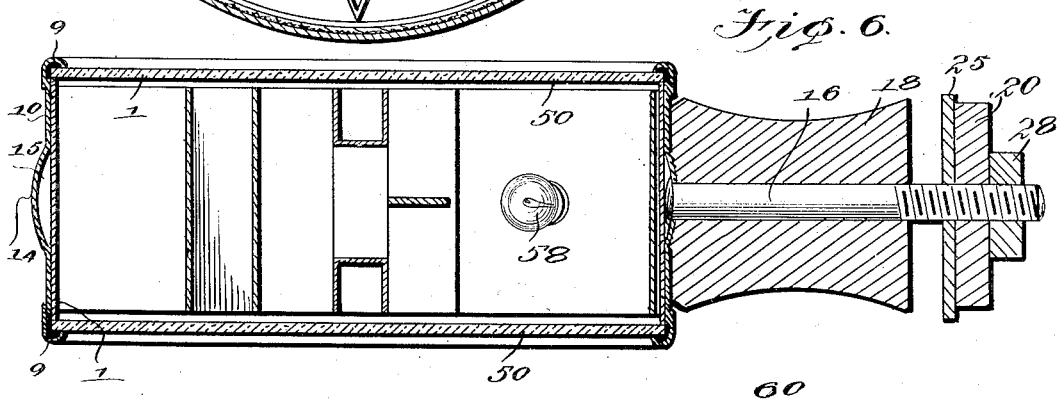
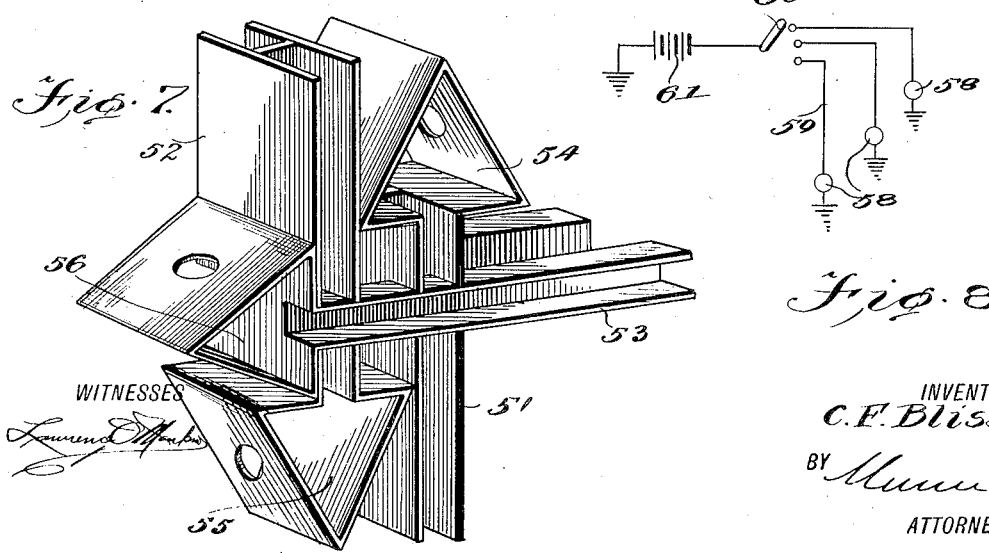
INVENTOR
C. F. Bliss,
BY
ATTORNEYS Patented Sept. 30, 1924.

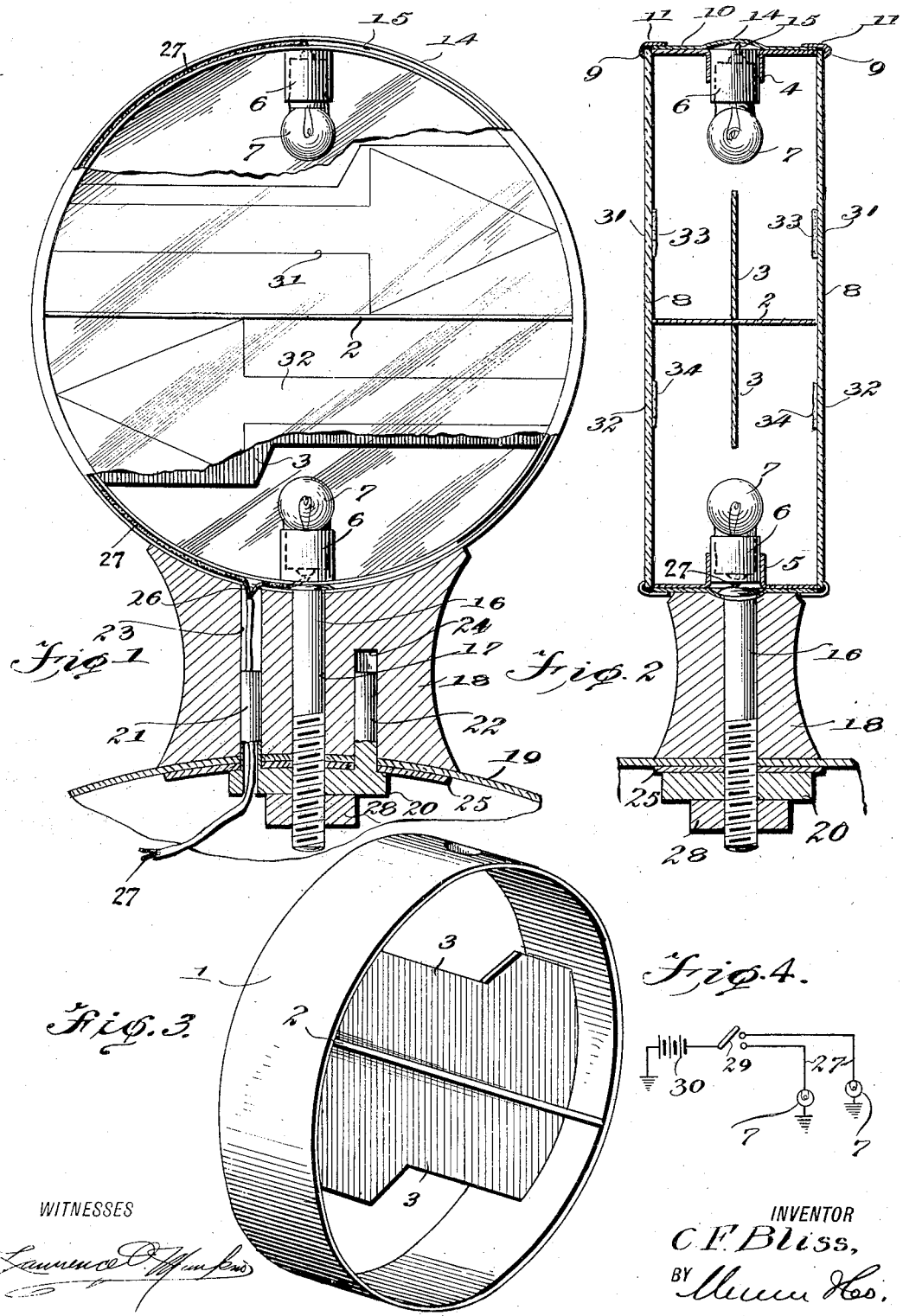

1,510,032

UNITED STATES PATENT OFFICE.

CHARLES FREDRICK BLISS, OF OLIVE, CALIFORNIA.

AUTOMOBILE SIGNAL.

Application filed February 8, 1922. Serial No. 534,955.

*To all whom it may concern:*

Be it known that I, CHARLES FREDRICK BLISS, a citizen of the United States, and a resident of Olive, in the county of Orange and State of California, have invented certain new and useful Improvements in Automobile Signals, of which the following is a specification.

My invention relates to signals for vehicles, particularly for automobile vehicles, and it consists in the combinations, constructions and arrangements herein described and claimed.

An object of my invention is to provide a device having signalling means adapted to be attached to various parts of a vehicle and to be operated at will by the driver of the vehicle to indicate his intentions with respect to changing the speed or direction of movement of the vehicle.

A further object of my invention is to provide a signal which includes means for illuminating the signalling elements thereof and which is therefore adapted for use at night as well as during the day.

A still further object of my invention is to provide a device in which the signalling means comprises no relatively moving parts and which is therefore not likely to get out of order easily and is thoroughly effective for the purpose intended.

Other objects and advantages will be apparent from the following description, and the novel features of the invention will be particularly outlined in the appended claims.

My invention is illustrated in the accompanying drawings, forming a part of this application, in which:

Fig. 1 is a view mainly in vertical section and partly in elevation, showing a practical embodiment of the invention applied to a support, Fig. 2 is a vertical section through the structure shown in Fig. 1, the view being taken at right angles to Fig. 1, Fig. 3 is a perspective view showing a cylindrical frame or body comprised in the embodiment of the invention illustrated in the preceding views, Fig. 4 is a diagrammatic view of a circuit which may be used in carrying my invention into effect in the form in which illustrated in the preceding view, Figs. 5 and 6 respectively are views similar to Figs. 1 and 2, showing another embodiment of the same invention attached to the support, Fig. 7 is a perspective view of a portion of the structure shown in Figs. 5 and 6, and Fig. 8 is a diagrammatic view showing a circuit suitable for use with the second embodiment of the invention.

Referring now to the drawings, in which like reference numerals indicate like parts throughout the several views, and particularly to Figs. 1 to 4 inclusive which relate to one embodiment of the invention, the numeral 1 denotes a cylindrical frame or body which is open at its ends and is divided by a diametrically disposed partition 2 into two semi-cylindrical compartments. The partition 2 extends longitudinally of the frame 1 from one end thereof to the other, and is intersected intermediately by a transverse partition having portions 3—3 extending from opposite sides of the partition 2 for appreciable distances therefrom, the ends of the portions 3 being joined to the inner walls of the frame 1, as shown.

As illustrated to advantage in Fig. 2, diametrically opposed integral tubular extensions 4 and 5 respectively extend into the two semi-cylindrical compartments from openings through the cylindrical body 1 intermediately of its length toward the edges of the portions 3—3. Sockets 6 are received within the tubular extensions. Incandescent lamps 7 interfitting the sockets 6 project within the semi-cylindrical compartments and terminate adjacent to the opposite edges of the portions 3—3, the axes of the sockets 6—6 being alined and lying in a plane extending substantially at right angles to the plane of the partition 2.

Circular glass panels 8—8 are arranged to abut the opposite ends of the cylindrical body 1 and are held clamped thereagainst by inwardly extending integral annular flanges 9—9 at the opposite ends of a binding ring or outer casing 10 which encircles the cylindrical body 1. The outer casing 10 is of the split-ring type and is formed at the meeting ends thereof with flanges or lugs 12—12 fastened together by bolts 13 to cause the binding ring to grip the body 1 and to securely hold the glass panels in place.

The binding ring 10 is formed with a peripheral portion thereof enlarged diametrically as indicated at 14 to define an annular space 15 between the cylindrical body 1 and the binding ring or casing. A bolt 16 is projected from the inner side of the binding ring through an opening in the wall thereof, through a bore 17 of a bracket member 18 and through a support 19, whereby the body 1 and the parts associated therewith as hereinbefore described may be removably secured to the support in the following manner. A retaining washer 20 is slipped over the projecting end of the bolt 16 and is provided with lugs 21 and 22 respectively received in a bore 23 extending through the bracket member 18 substantially parallel with the bore 17 and in a socket 24 formed in the bracket member 18. It is to be understood of course, that openings are provided through the support 19 in registry with the bore 23 and the socket 24 and that a spacing washer 25 interposed between the retaining washer 20 and the support 19 will likewise have suitable openings formed therethrough as shown, for the accommodation of the lugs 21 and 22. The lug 21 is tubular. The bore 23 communicates at its inner end through an opening 26 with the annular space 15 between the binding ring and the cylindrical body 1. Electrical conducting wires 27 are projected through the tubular lug 21, bore 23, the opening 26, and the annular space 15 and are then operatively connected with the sockets 6 for the incandescent lamps 7. A jam nut 28 threadedly engages the projecting portion of the bolt 16 and clamps the retaining washer 20 against the spacing washer 25 which is in turn held against the support 19, thereby insuring the engagement of the lugs 21 and 22 with the bracket member 18 and holding the binding ring or outer casing 10 and the parts associated therewith, against displacement relatively to the support 19.

As illustrated diagrammatically in Fig. 4, the conductors 27 lead to a switch 29 which in practice will be located at a distance from the lamp 7. For example, the support 19 may be a portion of the rear fender of an automobile and the switch 29 will by preference be secured to the dashboard of the automobile and adjacent to the driver. A suitable source of electric current supply 30 is included in the circuit and the switch 29 is of any suitable known type of construction which can be operated to occasion the energization of the lamps 7 selectively. It will be obvious that when each lamp 7 is energized the compartment in which that lamp is disposed will be illuminated. The glass panels 8—8 have arrow-shaped clear portions 31—31 and 32—32 respectively at the opposite ends of the semi-cylindrical compartments and are painted or otherwise treated in any suitable known manner to prevent the passage of rays of light through the remaining portion thereof. The arrows outlining the clear portions 31—31 are horizontally disposed with the head portions thereof pointing in the same direction and are entirely disposed below the plane of the upper edge of the partition 3. The arrow defining clear portions 32—32 are likewise horizontally disposed and the heads thereof point in the same direction but in the direction opposite to that of the head of the arrow defining portions 31—31. The portions 32—32 are located above the plane of the lower edge of the partition 3. If desired, strips of a translucent material fashioned to outline arrows coextensive with the transparent portions of the panels 8—8 may be secured to the inner side of the panels 8—8 in registry with the transparent portions, as indicated at 33—33 and 34—34 in Fig. 2 and the translucent strips or the transparent portions of the panels 8—8 may be colored as desired, in order to draw the attention of interested persons to the signals produced when the lamps 7 are energized.

From the foregoing description of the various parts of the device, the operation thereof may be readily understood. When the body 1 has been arranged with the partition 2 in horizontal position as described, the arrow of the upper semi-cylindrical compartment will point in one direction, as for instance to the right of the vehicle, and the arrow in the lower compartment will point in the reverse direction. The switch 29 may be operated to occasion the energization of the lamp in the upper compartment and thus indicate the driver's intention of turning to the right. When the lamp of the lower compartment is energized, the driver's intention of turning to the left will be indicated. The signal given will be visible to persons in front of the vehicle equipped with the device, as well as to persons to the rear of the vehicle. The partition portions 3—3 serve as shields and prevent rays of light from sources located exteriorly of the body 1, passing through the latter in such manner as to give signals in the manner described.

Referring now particularly to Figs. 5 to 8 inclusive, it is to be observed that I illustrate therein a second embodiment of the same invention. I shall confine my description of the second embodiment of the invention to the parts thereof which differ in detail from parts of the embodiment of the invention heretofore described.

The panels at the end of the body 1 of the second embodiment of the invention are denoted at 50—50 and are transparent instead of having portions thereof treated to resist the passage of rays of light therethrough, as described for the panels 8—8. Instead of the partitions 2 and 3—3, strips 51, 52 and 53 respectively are arranged within the body 1 to outline arrows 54, 55 and 56 respectively. The width of each of the strips 51, 52 and 53 is substantially equal to the length of the body 1 and the respective strips are arranged so that the side edges thereof abut the inner walls of the transparent panels 50—50 thereby separating the interior spaces of the arrows from one another. The arrows 54 and 55 are arranged in horizontal position with the heads thereof pointing in opposite directions and the arrow 56 is vertically positioned with the head thereof pointing downward. Sockets 57 are carried by the respective strips so that incandescent lamps 58 fitted into the sockets will be positioned interiorly of the head portions of the arrows. Conductors 59 lead from the sockets 58 to a switch 60 which is shown diagrammatically in Fig. 8 and which may be of any suitable type of construction capable of operation to permit of the energization of the several lamps selectively. A battery 61 is included in the lamp operating circuit.

The operation of the second embodiment of the invention is identical in essential respects with that of the previously described embodiment. The lamp in the arrow 56 is energized to indicate the intention of the driver to stop or to proceed at a reduced speed, while the lamps in the arrows 54 and 55 are operated as required to indicate that the driver will turn to the right or left. Transverse partitions 62, 63 and 64 are arranged between the side walls of the arrows 54, 55 and 56 respectively, to prevent the passing of light from an external source through the body 1 in such manner as to illuminate the interior of the arrows and thus occasion the giving of false signals. It is to be observed that the signals given when the second embodiment of the invention is used, may be observed by a person in front of the vehicle equipped therewith and at the rear thereof. The bulbs of the lamps may be colored or, if desired, the panels 50—50 may be colored in order to better draw the attention of observers to the signal given.

Obviously, my invention is susceptible of embodiment in forms other than those illustrated in the drawings, and I therefore consider as my own, all such modifications and adaptations of the forms illustrated and described herein which fairly fall within the scope of the appended claims.

I claim:—

1. A signalling device comprising a cylindrical body, a signal device disposed within the cylindrical body, a binding ring encircling said body and being enlarged diametrically intermediate its ends to provide an annular channel encircling the cylindrical body, said body having an opening through its walls in communication with the annular channel, a bracket associated with the binding ring, said bracket and the channeled portion of said binding ring having alined openings formed therethrough, means for releasably holding the binding ring and bracket in clamped together relation and for clamping said bracket to a fixed support, and flexible means extending through the alined openings of the bracket and binding ring along the channel encircling the cylindrical body and through the first named opening in the latter to the signal device, whereby the latter may be energized.

2. A signalling device comprising a cylindrical body open at its ends, a signal device disposed within the cylindrical body, a binding ring encircling said body and being enlarged diametrically intermediate its ends to provide an annular channel encircling the cylindrical body, said body having an opening through its walls in communication with the annular channel, a bracket associated with the binding ring, said bracket and the channeled portion of said binding ring having alined openings formed therethrough, means for releasably holding the binding ring and bracket in clamped together relation and for clamping said bracket to a fixed support, flexible means extending through the alined openings of the bracket and binding ring along the channel encircling the cylindrical body and through the first named opening in the latter to the signal device, whereby the latter may be energized, and light admitting panels adapted for disposition in abutting relation to the opposite ends of the cylindrical body, said binding ring having flanges at its ends adapted to engage with said panels to hold the latter in abutting relation to the opposite ends of the cylindrical body.

CHARLES FREDRICK BLISS.